April 26, 1949.     J. D. CARPENTER ET AL     2,468,425
AIRPLANE WING FOLDING MECHANISM
Filed July 20, 1945
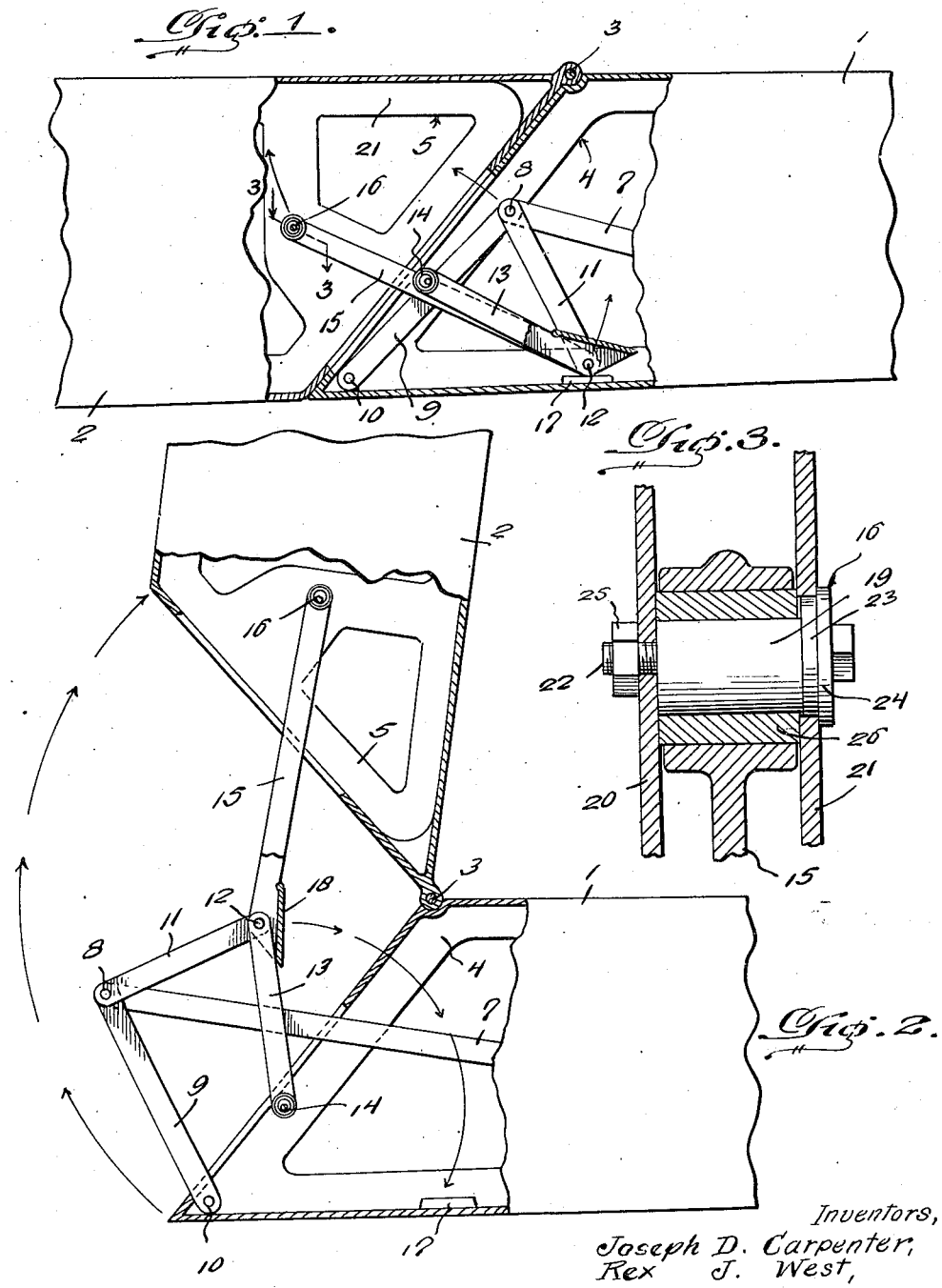
Inventors,
Joseph D. Carpenter,
Rex J. West,
Attorneys Patented Apr. 26, 1949

2,468,425

UNITED STATES PATENT OFFICE 2,468,425

AIRPLANE WING FOLDING MECHANISM

Joseph David Carpenter and Rex J. West,
Ottumwa, Iowa

Application July 20, 1945, Serial No. 606,118

4 Claims. (Cl. 74—520)

This invention relates to airplanes, and more particularly to a mechanism for use in airplanes having folding wing portions.

A main object of the invention is to provide a novel and improved wing-folding mechanism for use in aircraft whose wings are adapted to be folded to reduce their wing spread for storage in a limited space or for making the aircraft roadable to permit driving along a highway by folding the wings when not in flight.

A further object of the invention is to provide an improved wing-folding mechanism for aircraft which is positive in operation and has self-locking features.

A still further object of the invention is to provide an improved wing-folding mechanism provided with novel and simplified means for adjusting the length of elements of the mechanism.

Further objects and advantages of the invention will appear from the following description and claims, and from the accompanying drawings, wherein:

Figure 1 is a detail front elevational view, partly in section, of the jointed portions of the folding wing of an aircraft equipped with wing-folding mechanism, in accordance with this invention, the wing being shown in normal operative position.

Figure 2 is a detail view, partly in section of structure of Figure 1, the wing being shown in folded position.

Figure 3 is a detail cross-sectional view taken on line 3—3 of Figure 1, showing the means for adjusting the length of one of the members of the mechanism of this invention.

Referring to the drawings, 1 designates a fixed wing portion of an aircraft, said fixed wing portion being secured to the fuselage in a conventional manner. Hinged to fixed wing portion 1 is a folding wing panel 2, said panel normally abutting the fixed wing portion at an upwardly and inwardly inclined longitudinal plane and being pivotally joined thereto at a longitudinal hinge 3.

Element 1 is not limited to a fixed wing portion but may be another folding wing panel, where the wings are folded in two or more places.

Fixed wing portion 1 is provided with an internal hollow vertical frame structure 4 and folding wing panel 2 is provided with an internal vertical hollow frame structure 5 substantially in the same vertical plane as frame structure 4.

A linkage for rotating folding wing panel 2 from the normal position of Figure 1 to the folded position of Figure 2 is provided, said linkage comprising a power arm 7 pivotally secured at 8 to a first radius link 9, said link 9 being pivotally secured at 10 to the lower forward portion of frame structure 4, and a transfer link 11, pivotally secured at 12 to a second radius link 13 which is in turn pivotally secured at 14 to the forward portion of frame structure 4. Also, pivotally secured at 12 is a thrust link 15 extending into frame structure 5 of folding wing panel 2 and pivotally secured at 16 to said frame structure.

In the normal position shown in Figure 1 the end portions of the link members at connection 12 bear against a stop plate 17 carried by frame structure 4 which locks the linkage in the position corresponding to normal configuration of the wing, assuming that tension is applied to power arm 7 or that said arm 7 is maintained stationary by appropriate securing means. In this position, pivotal connection 12 is below a straight line drawn through stationary pivotal connections 14 and 16.

When forward pressure is applied to power arm 7, the linkage is rocked counter-clockwise and a thrust is transmitted to thrust link 15 which rotates folding wing panel 2 around its hinge 3 in a clockwise direction to the position shown in Figure 2. A stop flange 18 is provided at the lower end portion of thrust link 15 which cooperates with radius link 13 to limit clockwise rotation of the folding wing panel to the correct folded position. In this position pivotal connection 12 will be slightly forward of a straight line drawn between pivotal connections 14 and 16. The folding wing panel will be locked in the raised position of Figure 2 as long as forward pressure is maintained on power arm 7 or if said power arm is held stationary by appropriate securing means.

Referring to Figure 3, the structure of pivotal connection 16 is disclosed, said connection comprising an eccentric pin member 19 secured between front wall 20 and rear wall 21 of hollow frame structure 5. Pin member 19 is provided with a threaded shank portion 22 and a head portion comprising a circular collar 23 and a flange 24. Circular collar 23 is received in a circular opening in rear wall 21 concentric with the opening for shank portion 22 provided in front wall 20. A nut 25 is threadedly engaged with shank portion 22. The body portion of pin member 19 is cylindrical but is eccentrically related to the axis of shank portion 22. A bearing sleeve 26 is mounted on said body portion and the end of thrust arm 15 is pivotally mounted on said bearing sleeve. By rotating eccentric pin member 19, the effective length of thrust arm 15 may be varied, nut 25 being tightened to secure pin member 19 in a desired position of adjustment.

The pivotal connection 14 is also provided with an eccentric pin member and adjustably securing means therefor, but the pin member is substantially shorter than pin member 19 and the connection is made to only the front wall of hollow frame structure 4 in order to provide clearance for movement of thrust arm 15 and radius link 9 behind said pivotal connection. The effective length of radius arm 13 may thus be varied in a manner similar to that in which the length of thrust arm 15 may be varied. The combination of adjustments enables the linkage to be accurately set for desired performance.

Power arm 7 may be actuated by any appropriate reversible power mechanism such as a hydraulic cylinder mechanism or an electric motor-driven mechanism. The specific driving mechanism, forms no part of this invention.

While a specific embodiment of a wing-folding mechanism has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. In a control mechanism for folding elements comprising a primary element, a secondary element arranged in end-to-end meeting relation with respect to said primary element, a hinge interposed between the meeting ends of said elements and operatively connected to the latter, and linkage extending from said primary element to said secondary element and operatively connected to each of said elements, said linkage comprising a radius link, means pivotally mounting one end of said radius link in said primary element, a second radius link, means pivotally mounting one end of said second radius link also in said primary element, a transfer link connecting the free ends of said radius links, a thrust link associated with said second radius link and transfer link, means pivotally mounting said thrust link at a point in the secondary element, and a power arm associated with said first radius link and transfer link for actuating said linkage for opening and closing movement of said elements.

2. In a control mechanism for folding elements comprising a primary element, a secondary element, a hinge associated with said elements providing connecting means therefor, and a linkage operatively connecting said elements together, said linkage comprising a radius link, means pivotally mounting one end of said radius link in said primary element, a second radius link, means pivotally mounting one end of said second radius link also in said primary element, a transfer link connecting the free ends of said radius links, a thrust link associated with said second radius link and transfer link, means pivotally mounting said thrust link at a point in the secondary element, a power arm associated with said first radius link and transfer link for actuating said linkage for opening and closing movements of said elements, and eccentric elements associated with said pivotal mounting means providing adjustments in the links of the elements.

3. In a control mechanism for folding elements comprising a primary element, a secondary element, a hinge associated with said elements providing connecting means therefor, and linkage operatively connecting said elements together, said linkage comprising a radius link, means pivotally mounting one end of said radius link in said primary element, a second radius link, means pivotally mounting one end of said second radius link also in said primary element, a transfer link connecting the free ends of said radius links, a thrust link associated with said second radius link and transfer link, means pivotally mounting said thrust link at a point in the said secondary element, a power arm associated with said links for actuating said linkage for opening and closing movements of said elements, and a stop positioned to be contacted by the ends of said second radius link, transfer link, and thrust link providing locking means of the elements in the assembled position.

4. In a control mechanism for folding elements comprising a primary element, a secondary element, a hinge associated with said elements providing connecting means of the elements and positioned on a common side of the elements, and linkage operatively connecting said elements together, said linkage comprising a radius link, means pivotally mounting one end of said radius link at a point in the side of said primary element opposite to the hinge and offset therefrom, a second radius link, means pivotally mounting one end of said second radius link in said primary element at a point spaced from the side of said primary element opposite to the hinge, a transfer link connecting the ends of said radius links, a thrust link, one end of which is pivotally connected to said second radius link and transfer link, means pivotally mounting the opposite ends of said thrust link at a point in the secondary element spaced from the end and substantially midway of the element, and a power arm associated with said first radius link and transfer link and connected to both of said links at the point of intersection thereof for actuating said linkage for opening and closing movement of said elements.

JOSEPH DAVID CARPENTER.
REX J. WEST.

REFERENCES CITED

The following references are of record in the file of this patent:

UNITED STATES PATENTS

| Number | Name | Date |
| --- | --- | --- |
| 699,732 | Williams | May 13, 1902 |
| 2,153,667 | Hoekstra | Apr. 11, 1939 |
| 2,166,564 | Atwood et al. | July 18, 1939 |
| 2,181,501 | Beisel | Nov. 28, 1939 |
| 2,289,224 | Swanson et al. | July 7, 1942 |
| 2,352,074 | Brown et al. | June 20, 1944 |
| 2,372,852 | Randall | Apr. 3, 1945 |

FOREIGN PATENTS

| Number | Country | Date |
| --- | --- | --- |
| 490,964 | Great Britain | Aug. 24, 1938 |